United States Patent
Nishijima et al.

(12)
(10) Patent No.: US 6,224,101 B1
(45) Date of Patent: May 1, 2001

(54) AIR BAG, AIR BAG APPARATUS, AND STEERING WHEEL

(75) Inventors: Kazuyoshi Nishijima, Shizuoka; Tetsuji Endo, Fujinomiya; Kazuhiro Kaneko; Toshiyuki Sugiyama, both of Fuji; Tsuyoshi Watanabe, Fujinomiya, all of (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 09/269,357
(22) PCT Filed: Jul. 1, 1998
(86) PCT No.: PCT/JP98/02960
  § 371 Date: Jul. 6, 1999
  § 102(e) Date: Jul. 6, 1999
(87) PCT Pub. No.: WO99/28165
  PCT Pub. Date: Jun. 10, 1999

(30) Foreign Application Priority Data

Nov. 28, 1997 (JP) ................................................ 9-328384

(51) Int. Cl.[7] .................................................... B60R 21/16
(52) U.S. Cl. .................................... 280/743.2; 280/728.2; 280/739
(58) Field of Search .............................. 280/728.1, 728.2, 280/743.1, 731, 743.2, 739, 738

(56) References Cited

U.S. PATENT DOCUMENTS

| 5,249,824 | 10/1993 | Swann et al. . | |
| 5,464,250 | 11/1995 | Sato | 280/743.1 |
| 5,560,649 | 10/1996 | Saderholm et al. . | |
| 5,573,270 | 11/1996 | Sogi et al. . | |
| 5,957,485 | 9/1999 | Hirai | 280/729 |
| 6,086,092 | 7/1999 | Hill | 280/729 |
| 6,095,557 | 8/2000 | Takimoto et al. | 280/739 |

FOREIGN PATENT DOCUMENTS

| 2 323 569 | 9/1998 | (GB) . |
| 11-78745 | 3/1999 | (JP) . |

Primary Examiner—Paul N. Dickson
Assistant Examiner—Faye M. Fleming
(74) Attorney, Agent, or Firm—Dennis G. LaPointe; Mason & Assoc., P.A.

(57) ABSTRACT

An middle fabric portion (43) is disposed between a first fabric portion (41) and a second fabric portion (42) that constitute a pouch-shaped air bag (1). The middle fabric portion (43) divides the interior of the air bag (1) into a first compartment (45) and a second compartment (46). The two compartments (45,46) communicate by communicating openings (51) formed at locations near the outer edge of the middle fabric portion (43). A center communicating portion (53) at the center of the middle fabric portion (43) is fastened to a retainer (14). The first fabric portion (41) and the second fabric portion (42) communicate by a middle communicating portion (57) formed between the center communicating portion (53) and an outer edge portion (44). The communicating openings (51) are formed in the middle fabric portion (43), at locations near the outer edge of the middle fabric portion (43). When gas is introduced into the first compartment (45), the gas inflates the first compartment (45) into a flat shape and then flows through the communicating openings (51) into the second compartment (46) located at the occupant's side. The gas exits to the outside through a first gas outlet opening (58), which is formed in the second compartment. The second compartment (46) is provided with one or more second gas outlet openings, which serve as auxiliary gas outlets. Even if an air bag apparatus (2) is actuated in a situation where the occupant is at an out of the ordinary position, such that the occupant is in contact with the air bag apparatus (2), the invention ensures the reduction of the pressure applied to the occupant.

30 Claims, 14 Drawing Sheets

AIR BAG, AIR BAG APPARATUS, AND STEERING WHEEL

TECHNICAL FIELD

The present invention relates to an air bag incorporated in, for example, the steering wheel of a vehicle and adapted to be inflated by gas flowing into the air bag so as to reduce a shock delivered to an occupant of the vehicle. The invention also relates to an air bag apparatus including said air bag and a steering wheel equipped with said air bag apparatus.

BACKGROUND ART

Examples of conventional air bag apparatuses for a driver seat include an air bag apparatus incorporated in, for example, the steering wheel of an automobile and adapted to inflate a pouch-shaped air bag with gas flowing into the air bag so as to reduce a shock delivered to the driver of the automobile as a result of a collision. The air bag used for such an air bag apparatus is formed into a flat bag by sewing a pair of circular bag materials (panels) together along the edge. Each bag material is a geowoven made of a polyamide-based synthetic fiber. The air bag has a mounting hole which is formed in the bag material located at the side that faces the body of the vehicle so as to introduce gas into the air bag. The air bag is stored in the steering wheel in such a state that the air bag is folded into a compact shape with the material around the mounting hole affixed to the body of the steering wheel. When the inflator is actuated, the pressure of the gas ejected from the inflator expands the air bag toward the driver so as to receive and hold the driver, who has been thrown forward, thereby reducing the shock delivered to the driver.

An air bag having the configuration described above is required to inflate widely and flatly, and various structures to meet this requirement have heretofore been offered. For example, a configuration which calls for connecting the bag material at the driver side and the bag material at the vehicle side together by means of a tether belt is widely known to those skilled in the art. Furthermore, as described in Japanese Patent Laid-open No. 50437-1973, Japanese Patent Gazette No. 2631300 and the specification of European Patent No. EPO775614A2, another typical configuration well known to those skilled in the art calls for connecting the bag material at the driver side to the bag material at the vehicle side with a cloth which is provided with a gas flow-through hole, and introducing the gas ejected from the inflator into a plurality of sections inside the air bag, wherein the gas is introduced into the sections in sequence, from one section to another. These configurations are intended to effectively hold an occupant who sits in a normal position by limiting the shape into which the air bag may be inflated. Other known examples of the conventional art include a configuration described in Japanese Patent Laid-open No. 192703-1996, which includes cloth panels designed to control the flow of gas in such a way that the gas flows in the direction of the outer edge of the air bag. Yet another example, which is disclosed in Japanese Utility Model Publication No. 11084-1986, calls for dividing the interior of the pouch-shaped air bag into sections with sectioning members, which are connected to a gas supply opening by means of such an expansion limiting member as a belt.

Nowadays, there is a demand for an air bag apparatus which is capable of controlling the process of expansion of the air bag and reducing the pressure applied to an occupant even if the occupant is out of position, in other words the occupant is extremely close to the air bag apparatus or at any other out of the ordinary position.

In order to solve the above problems, an object of the present invention is to provide an air bag which is capable of controlling the shape of the air bag and the pressure to be applied to various locations of the air bag throughout the process of expansion of the air bag, and obtaining superior shock absorption characteristics

DISCLOSURE OF THE INVENTION

An air bag 2 according to the invention includes a first fabric portion 41 facing an object to be protected; a second fabric portion 42 adapted to form, in combination with the first fabric portion 41, an outer skin of the air bag 1, and being fastened to a supporting member 14; one or more middle fabric portions 43 to be disposed between the first fabric portion 41 and the second fabric portion 42 so as to form a plurality of compartments 45,46 that are arranged in layers such that the planar surfaces face the object to be protected; a center connecting portion 53 at which the middle fabric portion(s) 43 is (are) connected to said supporting member 14; one or more middle connecting portions 57 located between the center connecting portion 53 and the outer edge portion 44 and adapted to connect the middle fabric portion 43 to the second fabric portion 42; gas communicating portions 51 located between the middle connecting portion(s) 57 and the outer edge portion 44 and adapted to communicate between the compartments 45,46; and a gas inlet portion 48 which is adapted to permit the gas to be introduced therethrough and communicates with any one of the aforementioned compartments 45,46 other than the compartment that is located closest to the object to be protected. Specifically, with the configuration as above, when gas is introduced from the gas inlet portion 48, the gas is supplied into the compartment(s) 45 located at a distance from the object to be protected and inflates said compartment(s) 45 into a given shape and, subsequently, the gas is fed through the gas communicating portions 51 into the compartment 46 positioned on the side where the object to be protected is located and inflates the compartment 46 into a given shape. As the middle fabric portion(s) 43 is (are) affixed at the center connecting portion 53 to the supporting member and affixed at the middle connecting portion(s) 57 to the second fabric portion 42, the shape into which the air bag is inflated can easily be controlled. In other words, the distance by which the air bag expands in the direction of the object to be protected and the pressure applied toward the object can easily be controlled. Therefore, the invention enables the easy reduction of the pressure applied to the object to be protected, which may be located extremely close to the air bag. As the gas communicating portions 51 are located between the middle connecting portion(s) 57 and the outer edge portion 44, it is possible to inflate the compartment(s) 45 located at a distance front the object to be protected into a given shape as far out as the outer edge portion 44, and subsequently feed the gas into the compartment 46 positioned on the side where the object to be protected is located, thereby inflating said compartment 46. Furthermore, as the compartment 46 positioned at the side where the object to be protected is located is inflated in such a manner as to cover the portion where the center connecting portion 53 is located, the invention ensures sufficient performance characteristics of shock absorption even at the location where the center connecting portion 53 is formed.

According to another feature of the invention, the middle connecting portion 57 or at least one of the middle connecting portions 57 is provided with a gas outlet portion 58 adapted to communicate the outside of the air bag with any one of the compartments 45,46 other than the compartment 45,46 that is located closest to the supporting member. As the gas outlet portion 58 for discharging the gas that has inflated the air bag is formed in a compartment 46 located closer to the object to be protected than is the compartment 45 which is provided with the gas inlet portion 48, this configuration is not only capable of respectively inflating the compartments 45,46 into desired shapes but also maintaining the inflated shapes for a given period of time. Furthermore, by forming a gas outlet portion 58 at a middle connecting portion 57 adapted to connect the middle fabric portion(s) 43 to the second fabric portion 42, the invention provides a simplified configuration and thereby enables the reduction of production costs.

An air bag according to another feature of the invention includes a second gas outlet portion 61 which is located between the middle connecting portion 57 or one of the middle connecting portions 57 and the outer edge portion 44 and permits any one of the aforementioned compartments 45,46 other than the compartment 45,46 that is located closest to the object to be protected to communicate with the outside of the air bag. According to this configuration, a second gas outlet portion 61 is provided so that the compartment 45 which is located at a distance from the object to be protected and into which the gas is introduced from the gas inlet portion 48 communicates with the outside. Therefore, even in cases where the inflation of the compartment 46 facing the object to be protected encounters a great resistance, this configuration is capable of discharging the gas from the second gas outlet portion 61 and thus limiting the gas fed into the compartment 46 facing the object to be protected, thereby easily reducing the pressure applied to the object to be protected, which is at a position extremely close to the air bag.

According to another feature of the invention, the ventilation resistance of the second gas outlet portion 61 is greater than the ventilation resistance of the gas communicating portions 51. Therefore, in cases where there is no resistance against the inflation of the compartment 46 facing the object to be protected, this configuration ensures the sufficient inflation of the compartment 46 facing the object to be protected.

According to yet another feature of the invention, the air bag includes a plurality of second gas outlet portions 61. Should one of the second gas outlet portions 61 be closed, this configuration is capable of discharging the gas from the other second gas outlet portion(s) 61 and thus limiting the gas fed into the compartment 46 facing the object to be protected, thereby easily reducing the pressure applied to the object to be protected, which is at a position extremely close to the air bag.

An air bag apparatus 2 according to the invention includes an air bag 1 having a configuration as described above, a cover C adapted to cover said air bag when the air bag is in the uninflated state, and a supporting member 14 to which the air bag 1 and the cover C are attached, wherein the middle fabric portion(s) 43 is (are) designed such that when the air bag inflates, the distance by which the portion of each middle fabric portion 43 corresponding to the center connecting portion 53, at which the middle fabric portion 43 is connected to the supporting member 14, projects toward the object to be protected is limited within a range such that the maximum projection plane does not go beyond the plane where the object-side end of the cover C is located when the air bag is in the unfolded state. As the maximum projection plane to which each middle fabric portion 43 inflates in the direction of the object to be protected projects from the center connecting portion 53, at which each middle fabric portion 43 is connected to the supporting member 14, is limited within such a range as to not go beyond the plane where the object-side end of the cover C, i.e. the end facing the object to be protected, is located when the air bag 1 is in the unfolded state, this configuration is capable of easily reducing the pressure applied to the object to be protected, which is at a position extremely close to the air bag.

A steering wheel 3 according to the invention is provided with an air bag apparatus 2 that includes an air bag 1 having a configuration as described above, a cover C adapted to cover said air bag 1 when the air bag 1 is in the uninflated state, and a supporting member 14 to which the air bag 1 and the cover C are attached, and also provided with a steering wheel body 4 adapted to permit said air bag apparatus 2 to be mounted thereon, wherein the middle fabric portion(s) 43 is (are) designed such that when the air bag 1 inflates, the distance by which the portion of each middle fabric portion 43 corresponding to the center connecting portion 53, at which the middle fabric portion 43 is connected to the supporting member 14, projects toward the object to be protected is limited within a range such that the maximum projection plane does not go beyond the plane where the object-side end of the steering wheel body 4 is located when the air bag 1 is in the unfolded state. As the maximum projection plane to which each middle fabric portion 43 inflates in the direction of the object to be protected projects from the center connecting portion 53, at which each middle fabric portion 43 is connected to the supporting member 14, is limited within such a range as to not go beyond the plane where the object-side end of the steering wheel body 4, i.e. the end facing the object to be protected, is located when the air bag 1 is in the unfolded state, this configuration is capable of easily reducing the pressure applied to the object to be protected, which is at a position extremely close to the air bag.

BEST MODE FOR CARRYING OUT THE INVENTION

Figure 1:
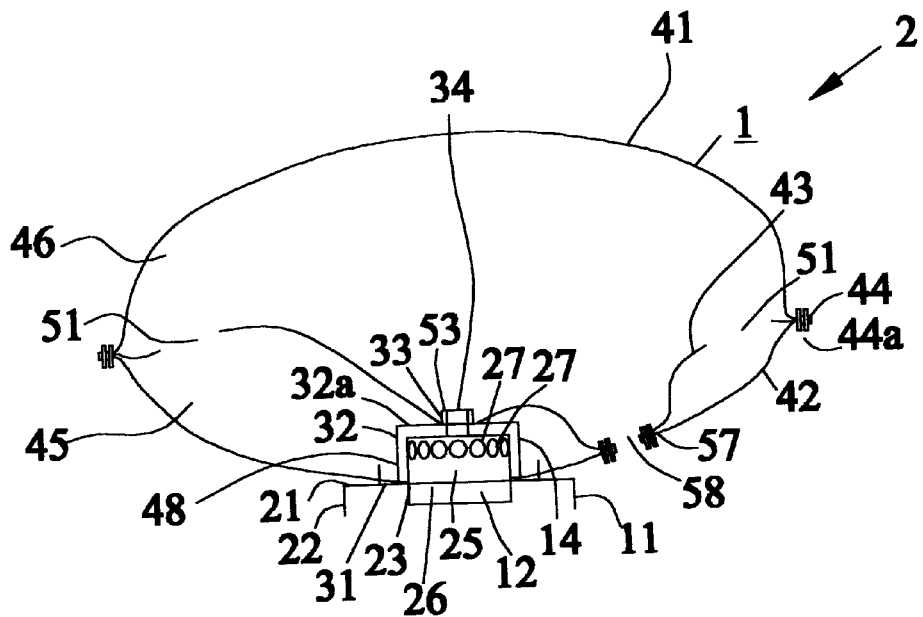
FIG. 1 is a sectional view of a part of an air bag apparatus, according to a first embodiment of the present invention in the state where the air bag is inflated, said part corresponding to the part along the line A—A of FIG. 2.

Next, an embodiment of an air bag apparatus according to the invention is explained hereunder, referring to the drawings.

Figure 2:
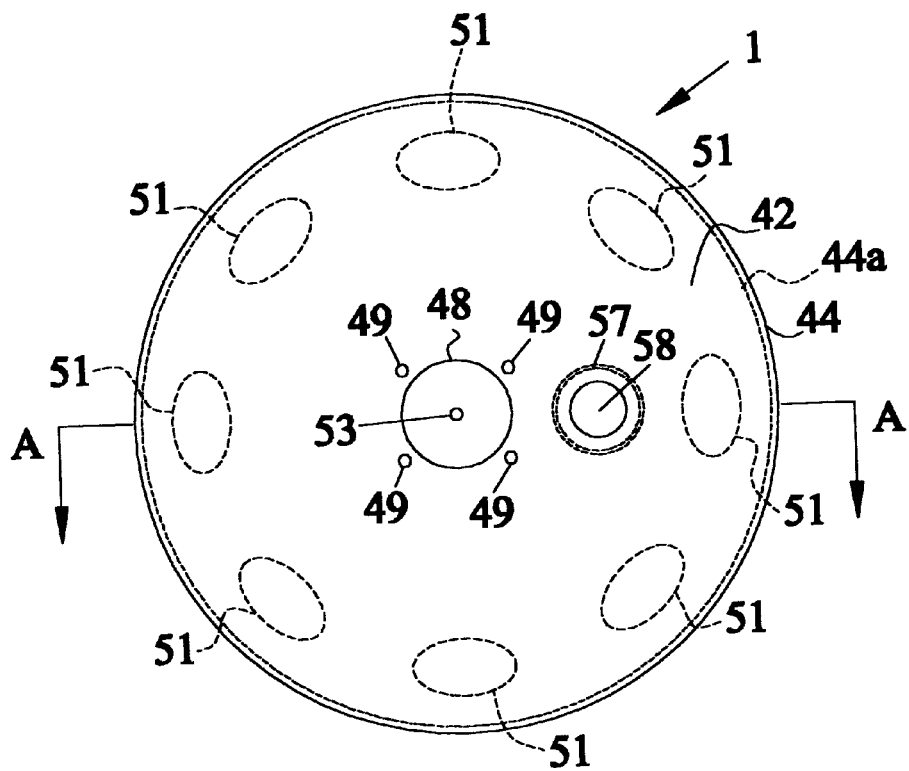
FIG. 2 is a bottom view of the same air bag.
Figure 19:
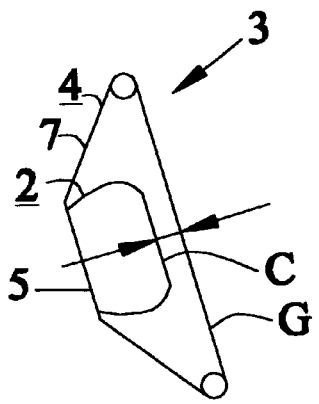
FIG. 19 is a schematic illustration of an embodiment of a steering wheel equipped with an air bag apparatus according to the present invention.
Figure 20:
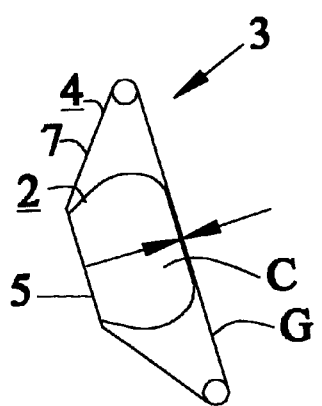
FIG. 20 is a schematic illustration of another embodiment of a steering wheel equipped with an air bag apparatus according to the present invention.

Referring to FIGS. 1 and 2, numeral 1 denotes an air bag. The air bag 1 constitutes an air bag apparatus 2, a part of which is shown in FIG. 1 The air bag apparatus 2 is attached to the boss portion 5 of the steering wheel body 4 of the steering wheel 3 of an automobile, as shown in FIGS. 19 and 20, in order to protect the object to be protected, i.e. the driver of the automobile, from a shock resulting from a collision of the automobile. Said steering wheel 3 is shown in, for example, FIG. 19. The steering wheel body 4 is comprised of an annular rim portion 6, a boss portion 5 located inside the ring defined by the rim portion 6, and three or four spokes 7, which connect the rim portion and the boss portion together. The steering wheel 3 is normally provided at an angled position, as it is attached to a steering shaft, which itself is angled. In the explanation hereunder, the side to which the air bag apparatus is attached is referred to as the driver's side, the upper side or the front side, while the side opposite the driver's side is referred to as the automobile body side, the lower side or the back side.

As shown in FIG. 1, the air bag apparatus 2 essentially comprises a base plate 11, which serves as a supporting member, and components mounted on the base plate 11, such as an air bag 1, an inflator 12, a retainer 14 serving as a supporting member, and a cover C, which is shown in FIG. 19.

The base plate 11 is formed of a metal plate by means including press molding so that the base plate 11 consists of a generally rectangular flat base plate portion 21 and a side plate portion 22, which is formed as an integral body with the base plate portion by bending the peripheral edge portion of the bare plate portion 21 downward. The base plate portion 21 is provided at its approximate center with a circular hole, i.e. an inflator mounting hole 23 adapted to fit the inflator, and a plurality of bolt mounting holes, which are provided around the inflator mounting hole 23. Although the bolt mounting holes are not shown in the drawings, four holes are provided in the present embodiment. The side plate portion 22 has mounting tabs (not shown) which are attached to the core metal or other portions of the steering wheel body 4, which is shown in FIG. 19.

The inflator 12 includes a generally cylindrical main body 25, a flange portion 26 projecting from the outer edge of the main body 25, and a plurality of radially arranged gas ejection holes 27 which are located at the upper part of the main body 25 and serve to eject gas. Bolt mounting holes which communicate with the bolt mounting holes of the base plate 11 are formed in the flange portion 26.

The retainer 14 includes a ring-shaped retainer body 31 and an extended portion 32, which is integrally fanned with the retainer body 31 so as to rise upward from the retainer body. The extended portion 32 may have a cup-like shape. Mounting bolts adapted to be respectively inserted into the bolt mounting holes are fastened to the retainer body 31 in such a manner as to project downward. The extended portion 32 is provided with one or more through holes (not shown) and a fastening hole 33. Said through holes are formed near the outer circumferential end of the extended portion 32 and serve to permit the gas to flow therethrough. The fastening hole 33 is located at the center of a fastening plate portion 32a covering the upper part of the inflator 12, and serves as a fastening portion that constitutes a limiting means. The fastening hole 33 is adapted to permit a fastening screw 34 to be screwed therein. Said screw 34 serves as a fixture that constitutes a limiting means.

The cover C, which is shown in FIGS. 19 and 20, is integrally formed of a synthetic resin and comprises a curved cover portion and a mounting wall portion. The cover portion is adapted to cover the boss portion 5 of the steering wheel body 4 and a part of the rim portion 6 of the steering wheel. The mounting wall portion is in the shape of a square tube projecting downward from the underside of the cover portion. The space defined by the bottom of the cover portion and the inner surface of the mounting wall portion serves as the storing space for the air bag 1. Facing this air bag storage space, a tear line having a shape resembling the letter H when viewed from below or any other appropriate shape and weaker than the remaining part of the cover portion is formed in the underside of the cover portion. The mounting wall portion is adapted to fit around the outer wall of the side plate portion 22 of the base plate 11 and to be affixed to the base plate 11 with a plurality of rivets or by a other appropriate means.

The air bag 1 comprises a first fabric portion (front panel) 41 and a second fabric portion 42 (back panel), both of which have a circular shape and adapted to be placed one upon the other, and a middle fabric portion (middle panel) 43 to be placed between the two fabric portions 41,42. The outer edge portions 44 of these fabric portions 41,42,43 are integrally sewn together along a circumferential seam portion 44a of each fabric portion so that a flat, pouch-shaped outer skin and that the middle fabric portion 43 divides the interior of the outer surface into a first compartment 45 and a second compartment 46 located on top of the first compartment 45.

A gas inlet opening 48, as shown in FIG. 2, adapted to fit around the inflator and serve as a gas inlet is formed at the center of the second fabric material 42 located at the lower side of the air bag. A plurality of bolt mounting holes 49 serving as bag fastening boles are formed around the gas inlet opening 48.

As shown in FIG. 2, the middle fabric portion 43 is provided with a plurality of communicating openings (first vent holes) 51, which are located near the outer edge portions 44 of the middles fabric portion 43 and serve as a gas communicating portion. The communicating openings 51 have an approximately oval shape and are radially arranged at nearly regular intervals. A fastening hole which is adapted to permit the fastening screw 34 to be inserted and thus serves as a fastenable portion is formed at the center of the middle fabric portion 43. Thus, the center of the middle fabric portion 43 constitutes a center connecting portion 53.

The middle fabric portion 43 and the second fabric material 42 are each provided with one or more circular holes located closer to the center of the fabric portion than are the first communicating openings 51. Each circular hole of the middle fabric portion 43 is paired with a circular hole of the second fabric material 42 so that the two holes are at a position corresponding to each other and communicate with each other. The perimeters of each pair of circular holes are nearly airtightly sewn together along a seam line, i.e. a middle connecting portion 57, and thus constitutes a first gas outlet opening (vent hole) 58 serving as a gas outlet portion. Each first gas outlet opening 58 does not communicate with the first compartment 45; it communicates only with the second compartment 46.

The air bag apparatus 2 described above may be assembled as follows: first, the retainer 14 is inserted into the first compartment 45 of the air bag 1, and the mounting bolts are inserted into the bolt mounting holes 49 of the air bag 1 and the bolt mounting holes of the base plate 11, while the fastening screw 34, which has been inserted from above into the fastening hole of the center connecting portion 53 of the middle fabric portion 43, is screwed in the fastening hole 33 of the retainer 14, so that the center of the middle fabric portion 43, i.e. the center connecting portion 53, is fastened to the retainer 14. Then, the air bag 1 is folded into a given shape, and the cover C is fitted from above over the folded air bag 1. Thereafter, through the inflator mounting portion 23 of the base plate 11 and the gas inlet opening 48 of the air bag 1, the upper part of the retainer 14 is inserted from underneath into the first compartment 45, and the mounting bolts are inserted into the bolt mounting holes of the flange portion 26 and tightened from underneath with a nut. In this state, the air bag 1 and the base plate ii are secured between the retainer 14 and the inflator 12. Thus, the assembly of the air bag apparatus 2 is completed.

In cases where a shock resulting from a collision is delivered to an automobile equipped with an air bag apparatus 2 described above, the inflator 12, shown in FIG. 3, is actuated by a control unit (not shown) so that gas is instantaneously ejected from the gas ejection holes 27 of the inflator 12 into the air bag 1. As a result, the air bag 1 inflates with the cover C, shown in FIGS. 19 and 20, torn along the tear line and expands into a given shape in front of the driver so that it receives and holds the driver, who has been thrown forward, to reduce the shock delivered to the driver.

Figure 3:
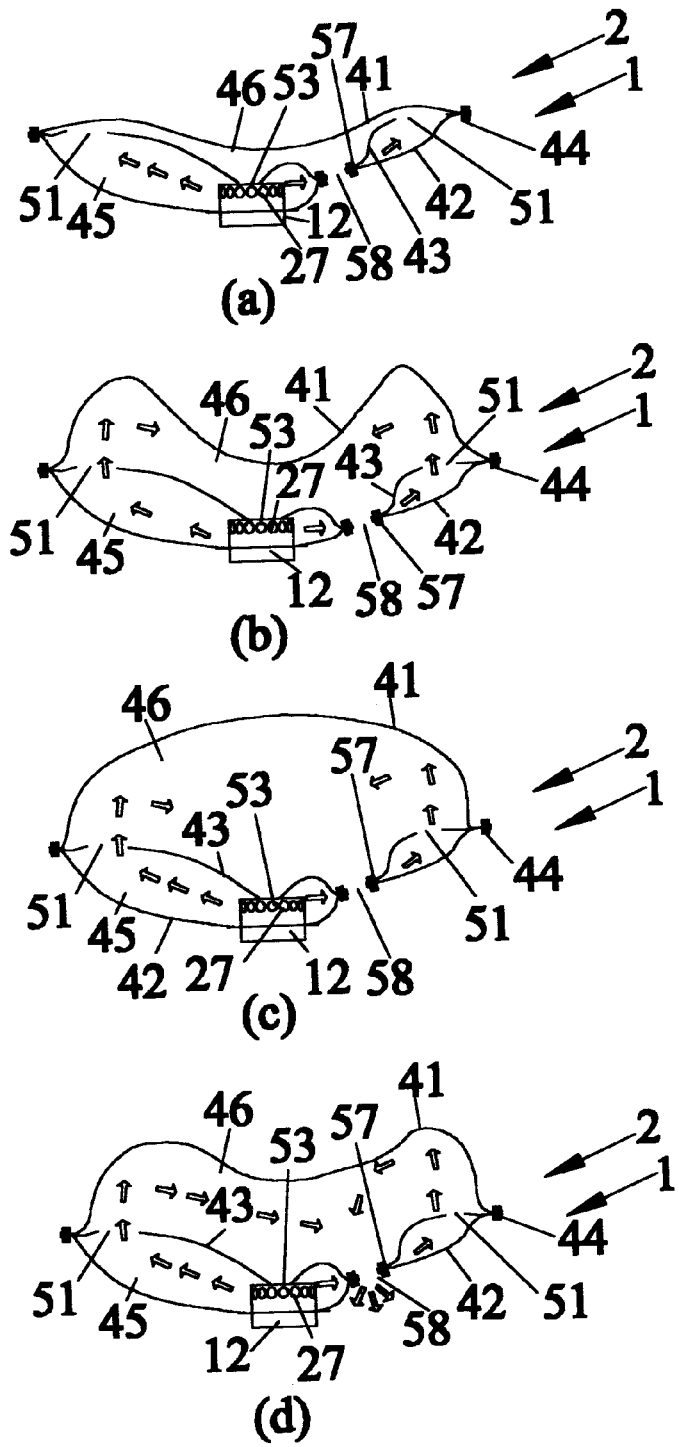
FIG. 3 is a schematic illustration to explain how the air bag is unfolded.
Figure 4:
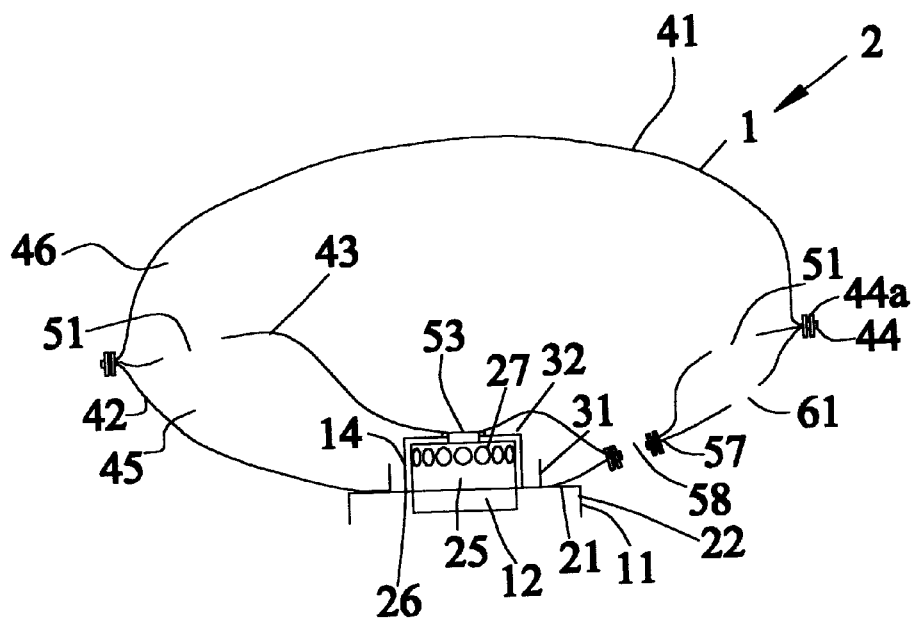
FIG. 4 is a sectional view of a part of an air bag apparatus according to a second embodiment of the present invention in the state where the air bag is inflated.
Figure 5:
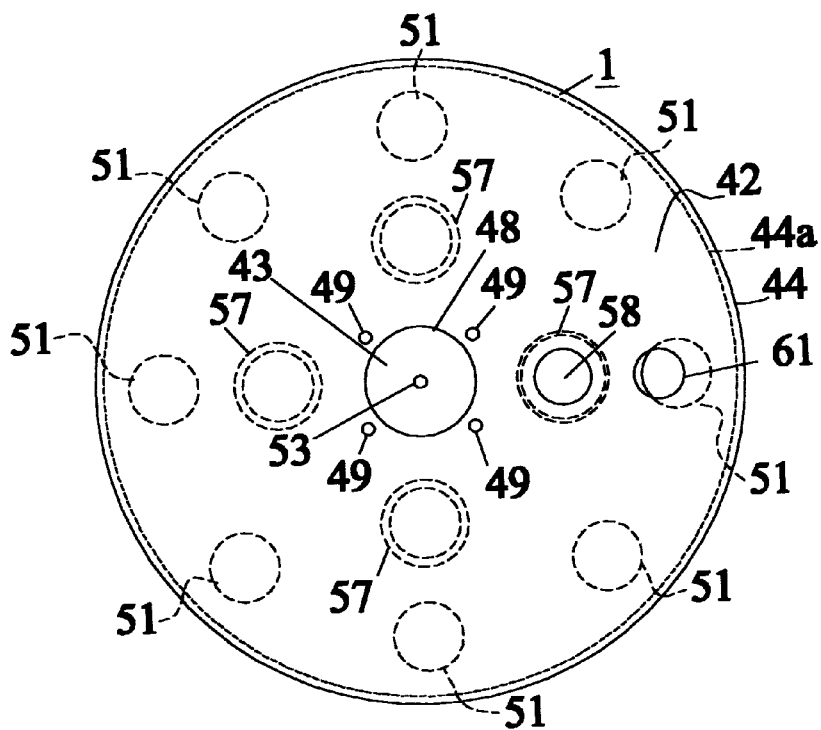
FIG. 5 is a bottom view of the air bag of same.

Next, referring to FIG. 3, how the air bag 1 expands is explained in detail. In FIG. 3, the air bag 1 and the inflator 12 alone are illustrated.

First, as shown in FIG. 3 (a), the gas ejected from the inflator 12 moves radially and is directly introduced into the first compartment 45. As the middle fabric portion 43 is fastened to the retainer 14 at the center connecting portion 53 and also to the second fabric portion 42 at the middle connecting portion 57, the first compartment 45 expands outward in an extremely flat shape. Thereafter, as shown in FIG. 3 (b), the gas flows through the communicating openings 51 located near the outer edge of the middle fabric portion 43 into the second compartment 46, which is located at the driver's side, thereby inflating the second compartment 46 inward from the direction of the outer circumferential edge. As a result, the entire air bag 1 is inflated into a given shape as shown in FIG. 3 (c). When the driver impacts onto the air bag 1 or in a similar event, the gas is discharged, as shown in FIG. 3 (d), through the first gas outlet opening 58 communicating with the second compartment 46, thereby absorbing the shock delivered to the driver.

As described above, according to the structure of the present embodiment, a plurality of horizontally elongated compartments 45,46 are disposed one over the other with the middle fabric portion 43 disposed in the air bag 1; the center connecting portion 53 of the middle fabric portion 43 is fastened to the retainer 14, while the middle fabric portion 43 and the second fabric portion 42 are connected together by means of the middle connecting portion 57 located between the center connecting portion 53 and the outer edge portions 44; and the communicating openings 51 are provided between the middle connecting portion 57, which is located near the outer edge of the middle fabric portion 43, and the outer edge portion 44. The above configuration precisely defines the passage of the gas so that the first compartment 45, which is located at the automobile body side, rapidly inflates outward in the initial stage of the inflating process and that the second compartment 46 located at the driver's side then inflates from the direction of the outer circumferential edge toward the center of the second compartment In other words, the embodiment is capable of slowing the expansion of the center part, which is the part that applies the greatest load to the chest of the driver. Furthermore, as the middle fabric portion 43 is fastened to the retainer 14, which serves as a supporting member, by means of the center connecting portion 53 and fastened to the second fabric portion 42 by means of the middle connecting portion 57, the embodiment described above permits the air bag 1 to inflate flatly, limiting the distance by which the air bag 1 protects toward the driver as well as the pressure applied in the direction of the driver.

Therefore, the present embodiment is capable of reducing the pressure applied to the chest of the driver even if the air bag apparatus 2 is actuated in a situation where the driver is leaning forward at an extreme angle, such as a position where the driver's chest is in contact with the air bag apparatus 2, i.e. the steering wheel.

As the second compartment 46 located at the driver's side inflates in such a manner as to cover the center connecting portion 53 and the middle connecting portion 57, the present embodiment ensures sufficient performance characteristics of shock absorption even at the locations where the center connecting portion 53 and the middle connecting portion 57 are formed.

Furthermore, by forming the first gas outlet opening 58 in the middle connecting portion 57, which serves to connect the middle fabric portion 43 to the second fabric portion 42, the embodiment offers an air bag apparatus having a simple structure and thereby reduces its production cost.

As the gas ejected from the inflator 12 is discharged from the first gas outlet opening 58 toward the body of the automobile after inflating the first compartment 45 and then inflating the second compartment 46, the embodiment is capable of maintaining the air bag 1 in the inflated state for a long period of time and ensures stable and superior performance characteristics of shock absorption. In addition, because of a multiplier effect of a long passage of gas such as the one in the present embodiment and the configuration where the first gas outlet opening 58 is recessed inward with respect to the second fabric portion 42, the embodiment is also capable of limiting the discharged of heat to the outside of the air bag 1.

According to the embodiment described above, the gas is discharged to the outside of the air bag 1 from the first gas outlet opening 58 that communicates with the second compartment 46. However, the first compartment 45 may be provided with a gas outlet opening that directly communicates with the outside of the air bag.

With regard to this point, a second embodiment of the invention is explained, referring to FIGS. 4 through 7.

In addition to the components and portions shown in FIGS. 1 through 3 and described above, the second embodiment includes a second gas outlet opening 61 having a shape of a circular hole and serving as a second gas outlet portion. The second gas outlet opening 61 is formed in the second fabric portion 42, at a location between the center connecting portion 53 and the outer edge portion 44 and open at the automobile body side.

According to this embodiment, each communicating opening 51 has a shape of a circular hole. Furthermore, four middle connecting portions 57 for connecting the middle fabric portion 43 to the second fabric portion 42 are respectively formed at four symmetrical locations. Of the four middle connecting portions 57, the one near the second gas outlet opening 61 alone is provided with a first gas outlet opening 58 communicating with the second compartment 46.

Figure 6:
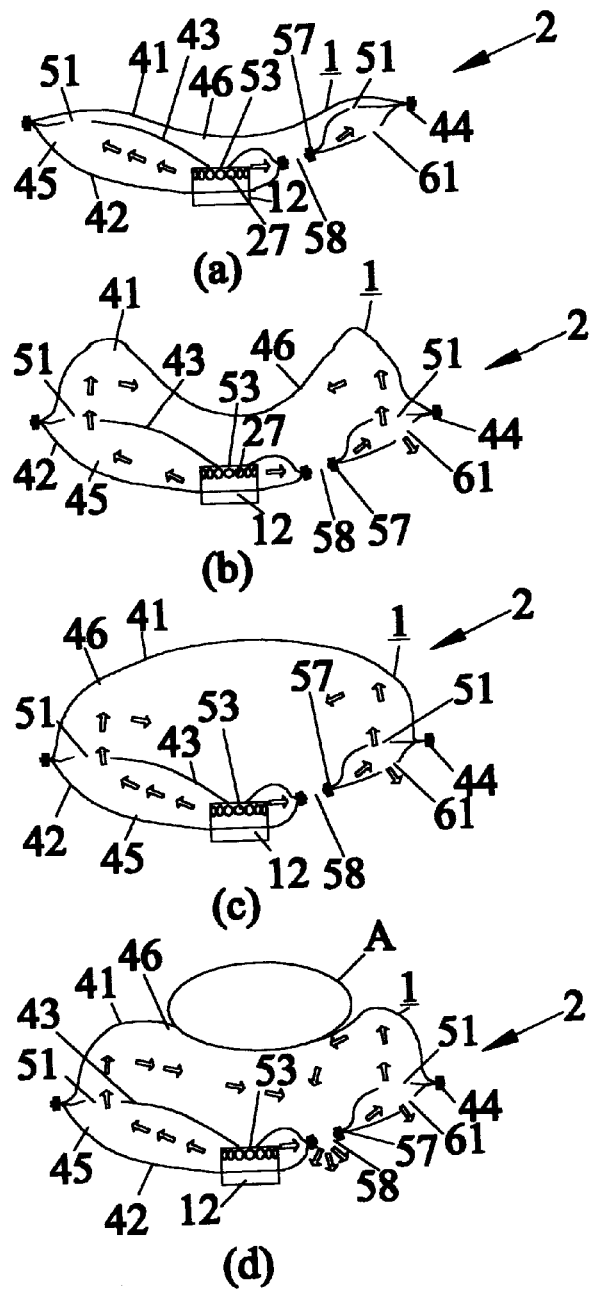
FIG. 6 is a schematic illustration to explain how the air bag is unfolded.

Next, referring to FIG. 6, how the air bag 1 expands is explained in detail. In FIG. 6, the air bag 1 and the inflator 12 alone are illustrated.

First, as shown in FIG. 6 (*a*), the gas ejected from the inflator 12 moves radially and is directly introduced into the first compartment 45. As the middle fabric portion 43 is fastened to the retainer 14 at the center connecting portion 53 and also to the second fabric portion 42 at the middle connecting portion 57, the first compartment 45 expands outward in an extremely flat shape. Thereafter, as shown in FIG. 6(*b*), the gas flows through the plurality of communicating openings 51, which are located near the outer edge of the middle fabric portion 43, into the second compartment 46 at the driver's side, thereby inflating the second compartment 46 inward from the direction of the outer circumferential edge. As a result, the entire air bag 1 is inflated into a given shape as shown in FIG. 6 (*c*). When the object to be protected, i.e. the driver A, impacts onto the air bag 1 or in a similar event, the gas is discharged, as shown in FIG. 6 (*d*), through the first gas outlet opening 58 communicating with the second compartment 46, thereby absorbing the shock delivered to the driver A.

Figure 7:
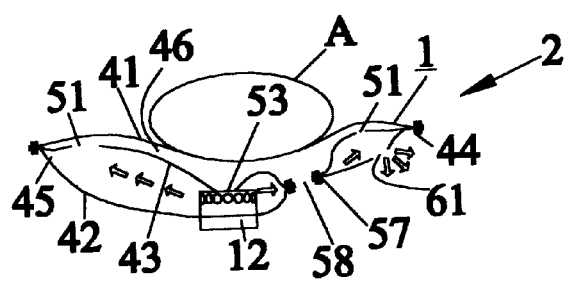
FIG. 7 is another schematic illustration to explain how the air bag is unfolded.

When the inflator 12 is actuated in such a state that the driver A is extremely close to the steering wheel as shown in FIG. 7, the gas ejected from the inflator 12 is radially introduced directly into the first compartment 45, thereby inflating the first compartment 45 into a flat shape. The gas further flows through the plurality of communicating openings 51 into the second compartment 46, thereby inflating the second compartment 46 to some extent from the direction of the outer circumferential edge. When the pressure applied from the driver A or other similar factors hinder the flow of the gas from the communicating openings 51 into the second compartment 46, the gas ejected from the inflator 12 is discharged to the outside of the air bag 1 through the second gas outlet opening 61 communicating with the first compartment 45. Although the above configuration slows the rate of increase of the total volume of the first and second compartments 45,46, it is easy to control the force applied to the chest or other part of the driver A within an appropriate range by releasing excessive pressure in the first compartment 45 to the outside.

As described above, according to the structure of the second embodiment, a second gas outlet opening 61 communicating directly with the first compartment 45 is provided as an auxiliary gas outlet. Therefore, in addition to the function and effects of the first embodiment described above, the second embodiment is capable of reducing the pressure applied to the chest of the driver even if the air bag apparatus 2 is actuated in a situation where the driver is leaning forward at an extreme angle, such as a position where the driver's chest is in contact with the air bag apparatus 2, i.e. the steering wheel.

The second gas outlet opening 61 described above also has the function of releasing excessive pressure in cases where the first gas outlet opening 58 is blocked by the members that constitute the steering wheel or the like.

The second gas outlet opening 61 may be formed at a location closer to the outer edge portion 44 than is the first gas outlet opening 58 in order to inflate the air bag 1 smoothly as far as the outer edge portion 44.

Further, the smooth inflation of the air bag 1 into a given shape can be ensured by forming the communicating openings 51 such that the total area of their apertures is greater than the first gas outlet opening 58 or the second gas outlet opening 61, in other words neither the first gas outlet opening 58 or the second gas outlet opening 61 has a ventilation resistance lower than that of the communicating openings 51.

The second gas outlet opening 61 directly communicating with the first compartment 45 may be formed such that its aperture is smaller than that of the first gas outlet opening 58, which directly communicates with the second compartment 46. In other words, the gas outlet opening 61 may be so formed as to have a higher ventilation resistance than that of the first gas outlet opening 58. As a result, the air bag 1 is ensured to inflate smoothly into a given shape in the state where no excessive pressure is applied to the second compartment 46.

Neither the first gas outlet opening 58 or the second gas outlet opening 61 is limited to a single, circular hole; both (particularly the second gas outlet opening 61 may be formed in various shapes at a plurality of locations. In addition to a circular hole, examples of shapes applicable to the gas outlet opening 58,61 include, and not limited to, a polygonal aperture and a slit. A gas outlet opening may be formed by increasing the air permeability of the weave of a part of the first fabric portion 41 or the second fabric portion 42. The partial increase of the air permeability may be done by removing a part of the coating member that coats a fabric material or by partially changing the weaving density or the texture of the fabric material.

Each one of the gas outlet openings 58,61 (particularly the second gas outlet opening 61) may be formed so as to be blocked when the air bag 1 is not in the inflated state, when the air bag 1 is contained in the cover, and open at such a point in the course of inflation of the air bag that the gas outlet opening in question is required to open. Examples of such gas outlet openings include a slit-like opening which is stitched up with thread and adapted to open when the air bag 1 inflates, with the stitches torn by the pressure of the inflation.

Figure 8:
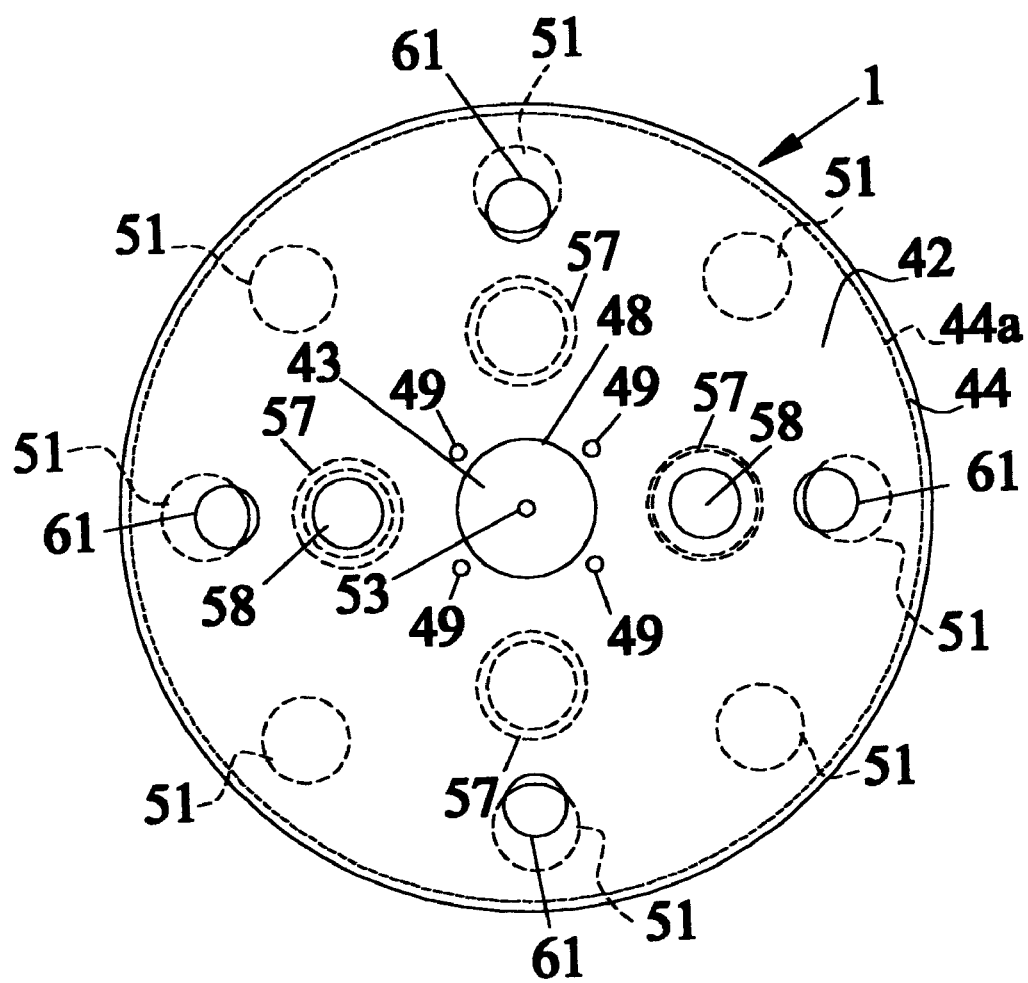
FIG. 8 is a bottom view of an air bag apparatus according to a third embodiment of the present invention.

For example, as the third embodiment shown in FIG. 8, a plurality of first gas outlet openings 58 and second gas outlet openings 61 may be provided. In case of the third embodiment, one each first gas outlet opening 58 is formed at two locations, while one each second gas outlet opening 61 is formed at four locations. By forming the gas outlet openings 58,61 at a plurality of locations as is true in the third embodiment, it is possible to limit excessive pressure directed toward the driver by discharging the gas through either gas outlet opening 58,61 even if the other gas outlet opening 58,61 is blocked by the members that constitute the steering wheel or in a similar situation.

Although the middle fabric portion 43 of the air bag 1 is connected to the second fabric portion 42 by the ring-shaped middle connecting portions 57 according to the embodiments as described above, the distance between the second fabric portion 42 and the middle fabric portion 43, in other words the degree of expansion of the middle fabric portion 43 with respect to the second fabric portion 42, can be controlled by connecting the second fabric portion 42 and the middle fabric portion 43 together by the middle fabric portion 43 which may or may not be provided with a first gas outlet opening 58 and have various shapes.

Figure 9:
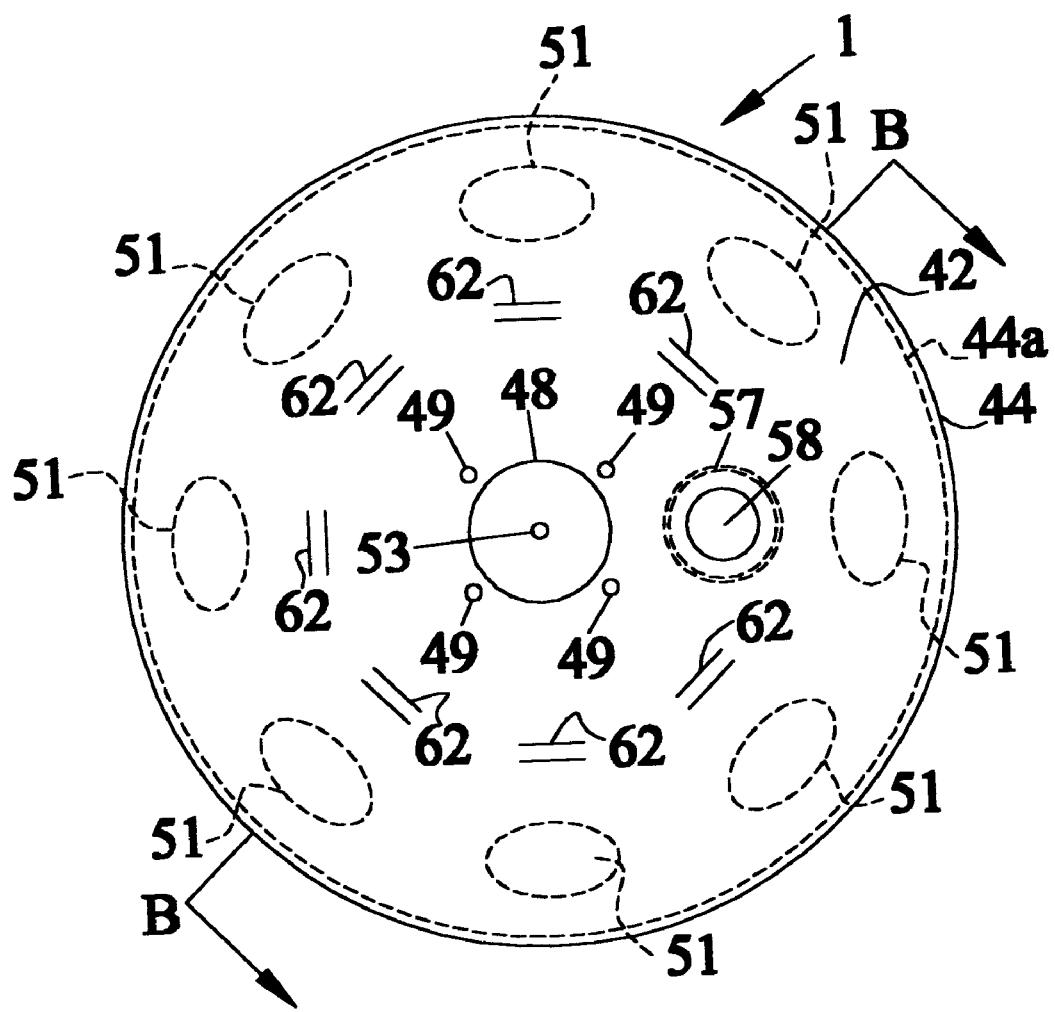
FIG. 9 is a bottom view of an air bag apparatus according to a fourth embodiment of the present invention.
Figure 10:
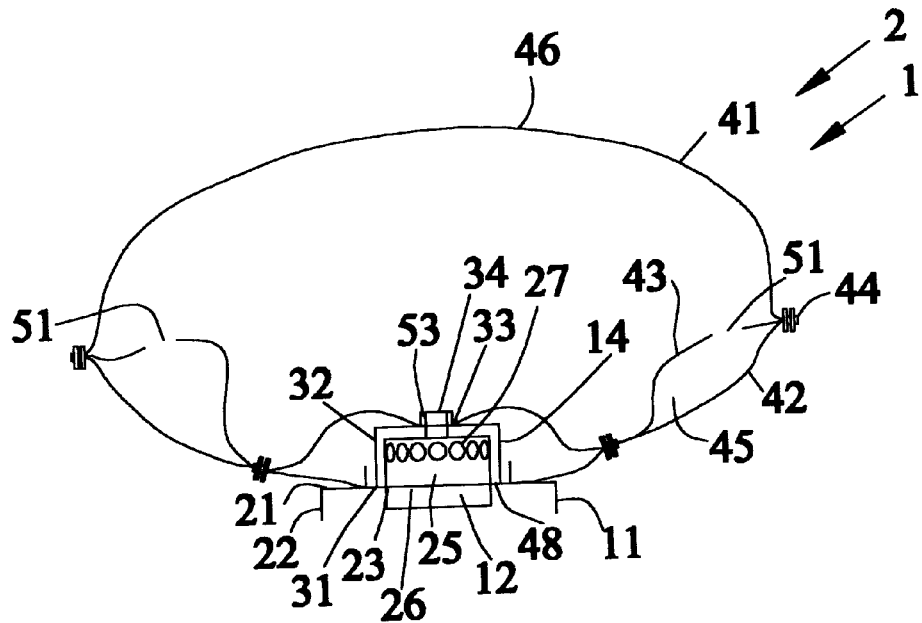
FIG. 10 is a sectional view of a part of the air bag in the state where the air bag is inflated, the part corresponding to the part along the line B—B of FIG. 9.

For example, as the fourth embodiment shown in FIGS. 9 and 10, the second fabric portion 42 and the middle fabric portion 43 may be connected by sewing them together at middle connecting portions 62 which consist of stitched lines arranged at regular intervals in such a manner as to extend in the circumferential direction, each combination of stitched lines respectively extending along concentric circles.

Figure 11:
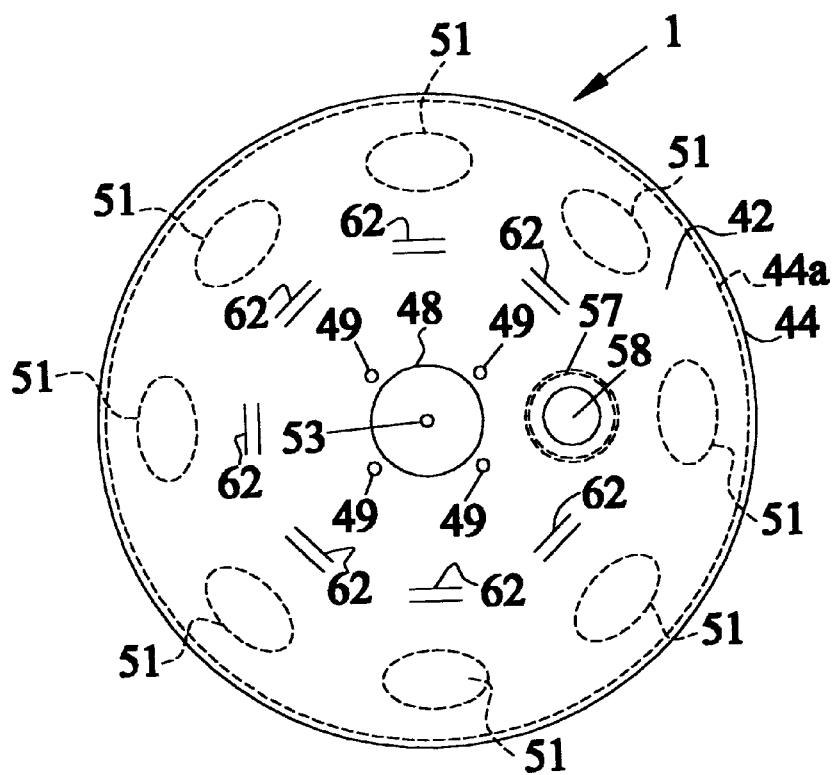
FIG. 11 is a bottom view of an air bag apparatus according to a fifth embodiment of the present invention.

The fifth embodiment shown in FIG. 11 represents another exemplary configuration, wherein middle connecting portions 62 consisting of stitched lines are arranged at staggered positions, i.e. are located at different distances from the center of each fabric portion. Instead of stitches where the second fabric portion 42 and the middle fabric portion 43 are brought into close contact and sewn together with thread, each middle connecting portion 62 may be in the form of a tether belt, hanging string or the like for limiting the distance between the second fabric portion 42 and the middle fabric portion 43 within a specified range.

By providing only a single middle fabric portion, in other words by limiting the total number of fabric portions to three and the number of compartments to two as all the embodiments described above, a simple configuration can be obtained at reduced production cost. In order to control the flow of the gas in more detail, however, two or more middle fabric portions may be provided so as to form multiple layers of compartments that consist of three or more compartments.

Figure 12:
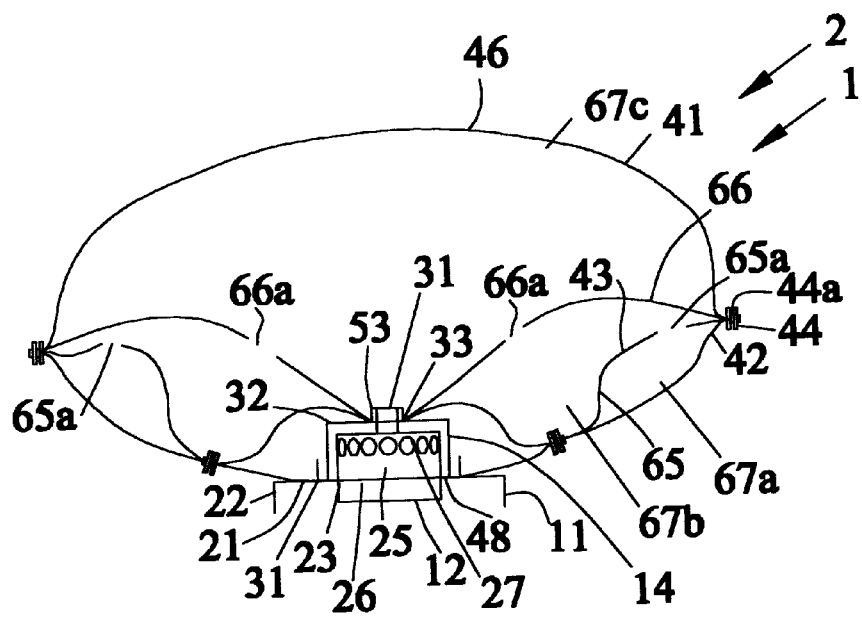
FIG. 12 is a sectional view of a part of an air bag apparatus according to a sixth embodiment of the present invention in the state where the air bag is inflated.

An example of such a configuration is offered in the sixth embodiment shown in FIG. 12, wherein first, second and third compartments 67a,67b,67c are formed by disposing a second middle fabric portion 66 above a first middle fabric portion 65 and forming communicating openings 65a,66a respectively in the two middle fabric portions 65,66. According to this configuration, a center connecting portion 53 is formed by fastening the center portions of the first and second middle fabric portions 65,66 to the center of the retainer 14. Other features of this embodiment lie in that the first middle fabric portion 65 is connected to the second fabric portion 42 along the middle connecting portions 62 consisting of stitched lines and that the third compartment 67c communicates with the space below via a gas outlet opening, which is not shown in the drawing. In other words, according to a configuration that includes a plurality of compartments, wherein gas is introduced from the inflator to the compartment at the automobile body side and discharged from the compartment at the driver's side, the main gas outlet opening, e.g. the first gas outlet opening 58, may be formed in any compartment other than the one into which the gas is first introduced, and an auxiliary main gas outlet opening, e.g. the second gas outlet opening 61, may be formed in any compartment other than the one that is provided with the main gas outlet opening.

In a configuration that includes a plurality of middle fabric portions, such as the embodiment described above, it is not always necessary to fasten all the middle fabric portions to a supporting member such as the retainer; it is sufficient to secure only the fabric portion that is adjacent to the supporting member. Furthermore, in addition to sewing the second fabric portion and the middle fabric portion adjacent to the second fabric portion together at specified locations, the middle fabric portions themselves may be stitched together at appropriate locations.

Although the center connecting portion 53 located at the center of the middle fabric portion 43 of the air bag 1 is fastened to the supporting member, i.e. the retainer 14, with the fastening screw 34 according to the embodiments described above, the structure of the center connecting portion 53 may be selected from among other variations.

Provided that it is permanently incorporated in the air bag apparatus 2 or the steering wheel body 4, the inflator 12 or the base plate 11 may serve as the supporting member. For example, as is true in the seventh embodiment shown in FIG. 13, the center connecting portion 53 may be formed by providing a fastening hole 33, which serves as a fastening portion constituting a limiting means, at the center of the upper part of the inflator 12 and screwing a fastening screw 34 in the fastening hole 33.

Figure 13:
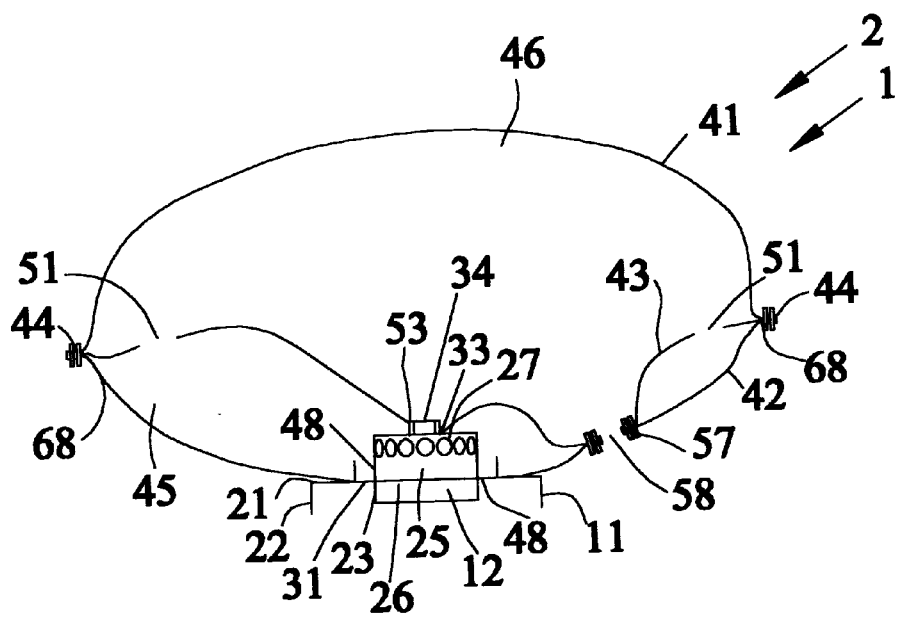
FIG. 13 is a sectional view of a part of an air bag apparatus according to a seventh embodiment of the present invention in the state where the air bag is inflated.

As shown in FIG. 13, after sewing together the outer edges of the fabric portions 41,42,43, which are placed one on top of another in the order of 43,41,42 or 42,41,43, the second fabric portion 42 is turned inside out at the location of the gas inlet opening 48, and thereafter, the first gas outlet opening 58 is formed by sewing around the circular hole, along the middle connecting portion 57 so that a selvage portion 68, i.e. the outer edge of the air bag, is tucked inside when the air bag 1 is in the state of a finished product.

There are other variations of the structure of the center connecting porting 53. Various examples are represented by the eighth through the twelfth embodiments shown in FIGS. 14 through 18.

Figure 14:
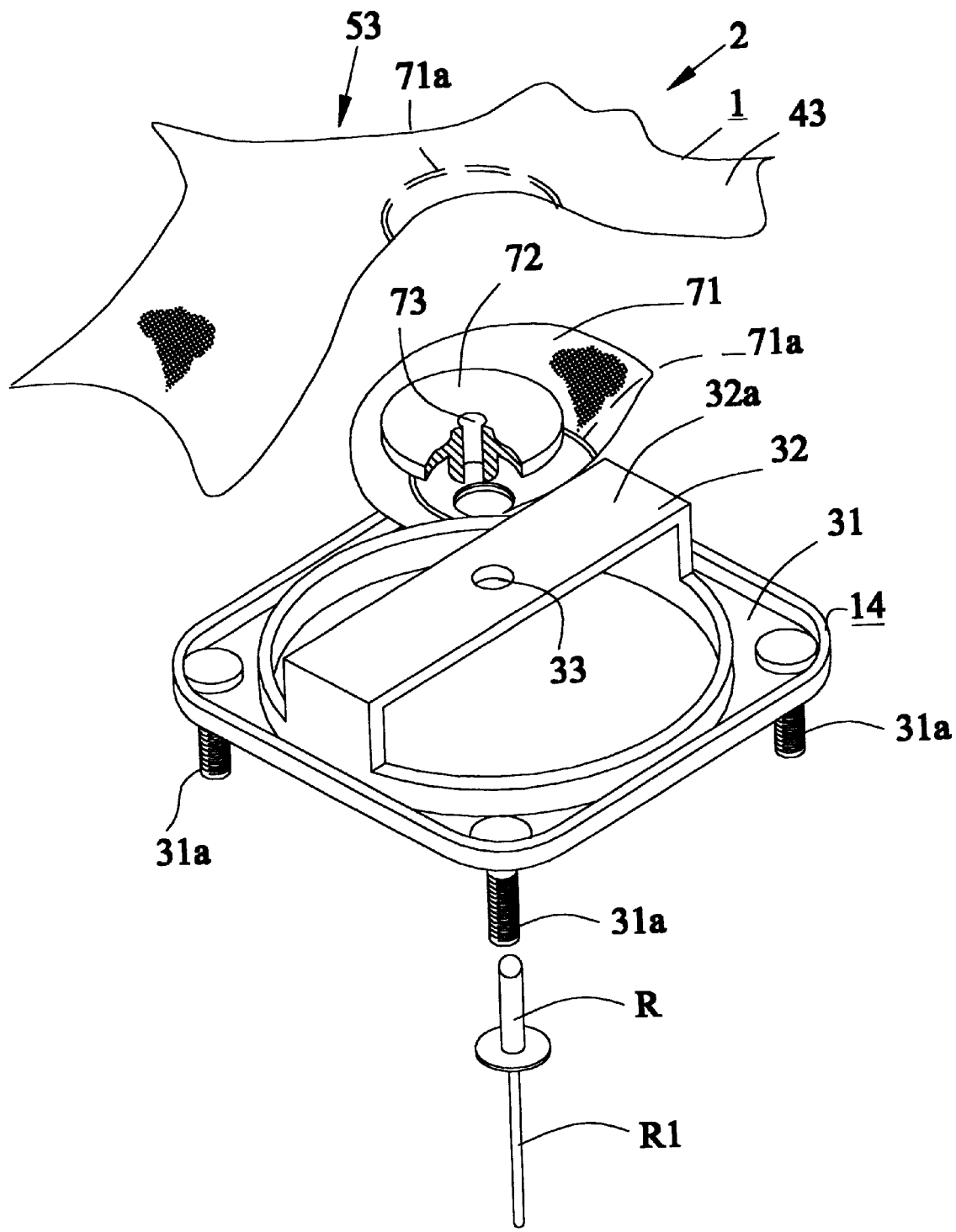
FIG. 14 is an exploded perspective of a part of an air bag apparatus according to an eighth embodiment of the present invention.

To be more specific, according to the eighth embodiment shown in FIG. 14, the retainer 14 includes a ring-shaped retainer body 31 and a plate-like extended portion 32 integrally formed with the retainer body 31, the extended portion 32 rising upward from the retainer body 31 and extending in such a manner as to straddle over the inflator 12. Mounting bolts 31a are fastened to the retainer body 31 in such a manner as to project downward. The extended portion 32 is provided with a fastening hole 33, which is a through hole serving as a fastening portion that constitutes a limiting means. The fastening hole 33 is located at the center of a fastening plate portion 32a, which covers the upper part of the inflator 12. A fastening cloth 71 is stitched along a seam line 71a so as to be sewn to the underside of the center of the middle fabric portion 43 of the air bag 1, and a fastenable seat (base) 72 is supported between the middle fabric portion 43 and the fastening cloth 71. Thus, the center connecting portion 53 is formed. According to this configuration, the middle fabric portion 43 can be connected to the supporting member by inserting a rivet R, which serves as a fixture, through the fastening hole 33 of the retainer 14 and a mounting hole 73 formed in the fastenable seat 72, and pulling a mandrel R1 of the rivet R, thereby crimping the rivet R so that the fastenable seat 72 is fastened to the retainer 14.

Figure 15:
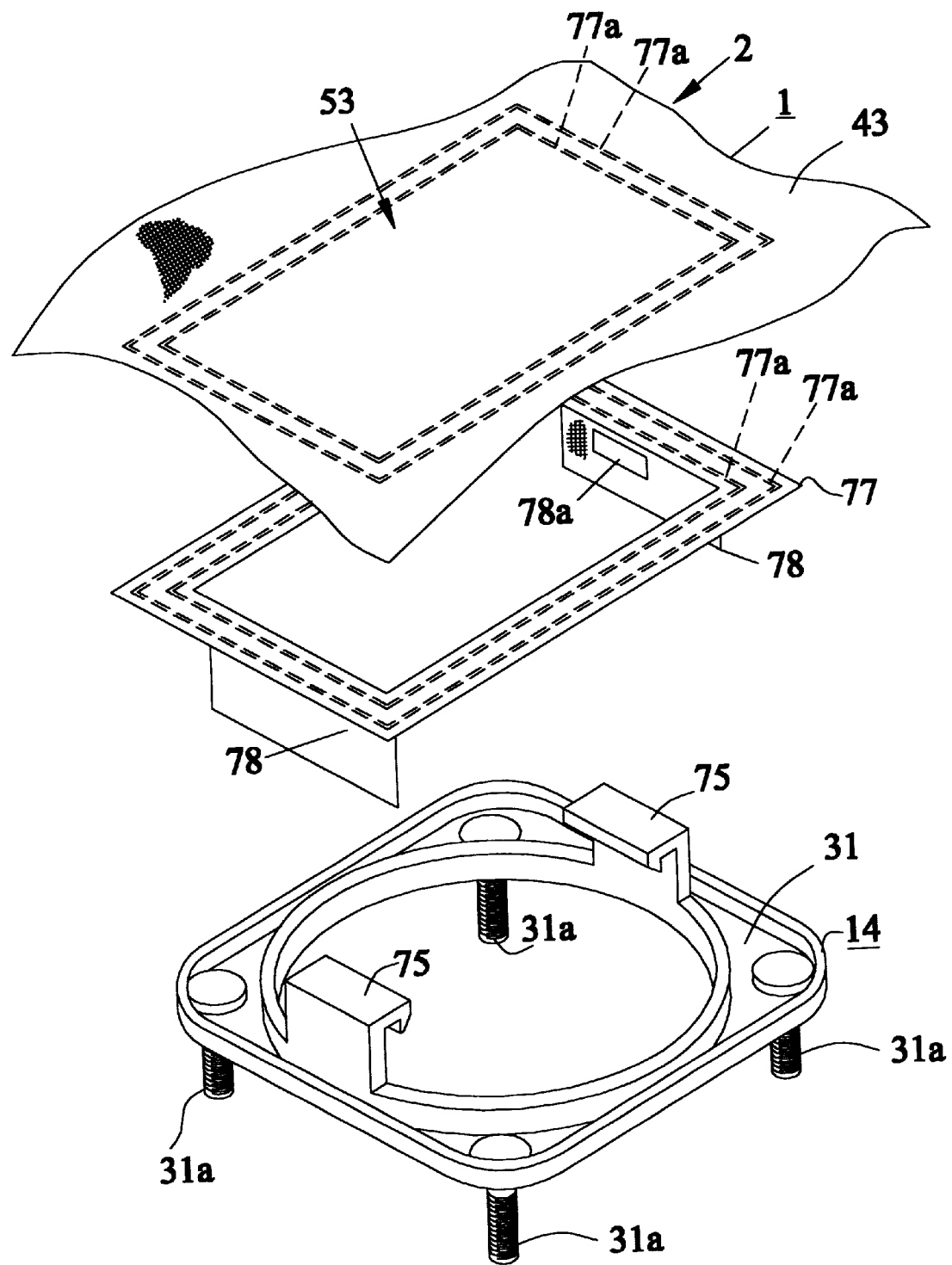
FIG. 15 is an exploded perspective of a part of an air bag apparatus according to a ninth embodiment of the present invention.

According to the ninth embodiment shown in FIG. 15, the retainer 14 includes a ring-shaped retainer body 31 and a pair of hook portions 75 which are integrally formed with the retainer body 31 and protrude from the retainer body 31. A fastening cloth 77 is stitched along a seam line 77a so as to be sewn to the underside of the center of the middle fabric portion 43 of the air bag 1, thereby forming the center connecting portion 53. The fastening cloth 77 is provided with a pair of hook receiving portions 78, each of which has a hooking hole 78a. With the configuration as above, the middle fabric portion 43 can be connected to the supporting member by respectively hooking the hook portions 75 of the retainer 14 in the hooking holes 78a of the hook receiving portions 73 of the middle fabric portion 43. Furthermore, according to this embodiment, when the inflator 12 is mounted at a given position, the end of each hooking portion 75 is in contact with the top of the inflator 12, thereby preventing inadvertent displacement of the middle fabric portion 43.

Figure 16:
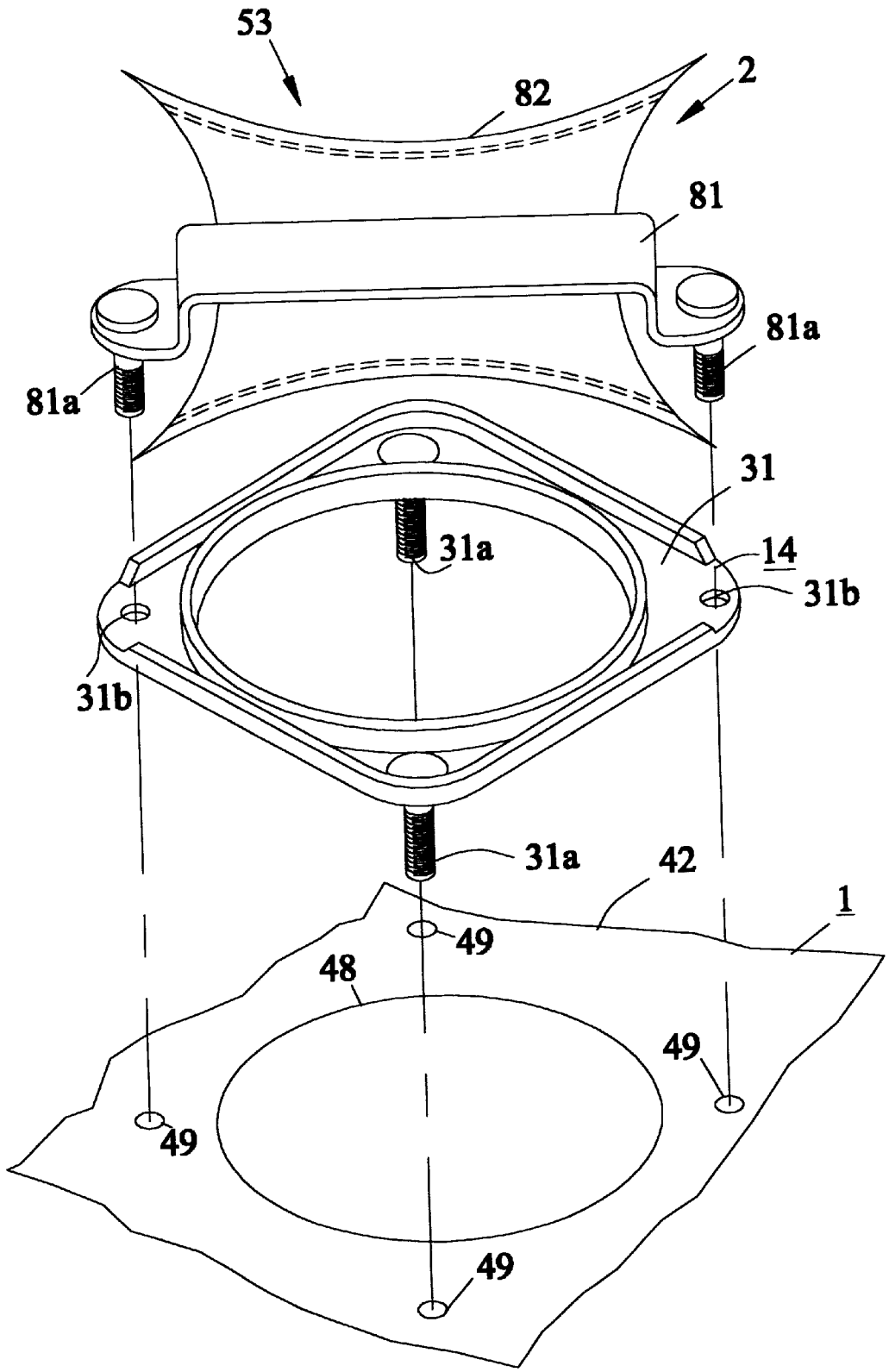
FIG. 16 is an exploded perspective of a part of an air bag apparatus according to a tenth embodiment of the present invention.

According to the tenth embodiment shown in FIG. 16, in place of an integrally formed extended portion, the retainer 14 is provided with a metal support 81 to be used in combination with the retainer 14. To be more specific, the metal support 81 is held at the center of the middle fabric portion 43 by a fastening cloth 82, which is sewn to the underside of the center of the middle fabric portion 43. A pair of mounting bolts (stud bolts) 81a are fastened to the metal support 81, while mounting holes 31b are formed in the retainer body 31 of the retainer 14. Therefore, by inserting the mounting bolts 81a through the mounting holes 31b of the retainer 14, and, in this state, inserting the mounting bolts 81a and the mounting bolts 31a of the retainer 14 through bolt mounting holes 49 formed in the flange portion 26 of the inflator 12 and tightening these mounting bolts 81a,31b, the center connecting portion 53 at which the middle fabric portion 43 is connected to the supporting member is formed.

Figure 17:
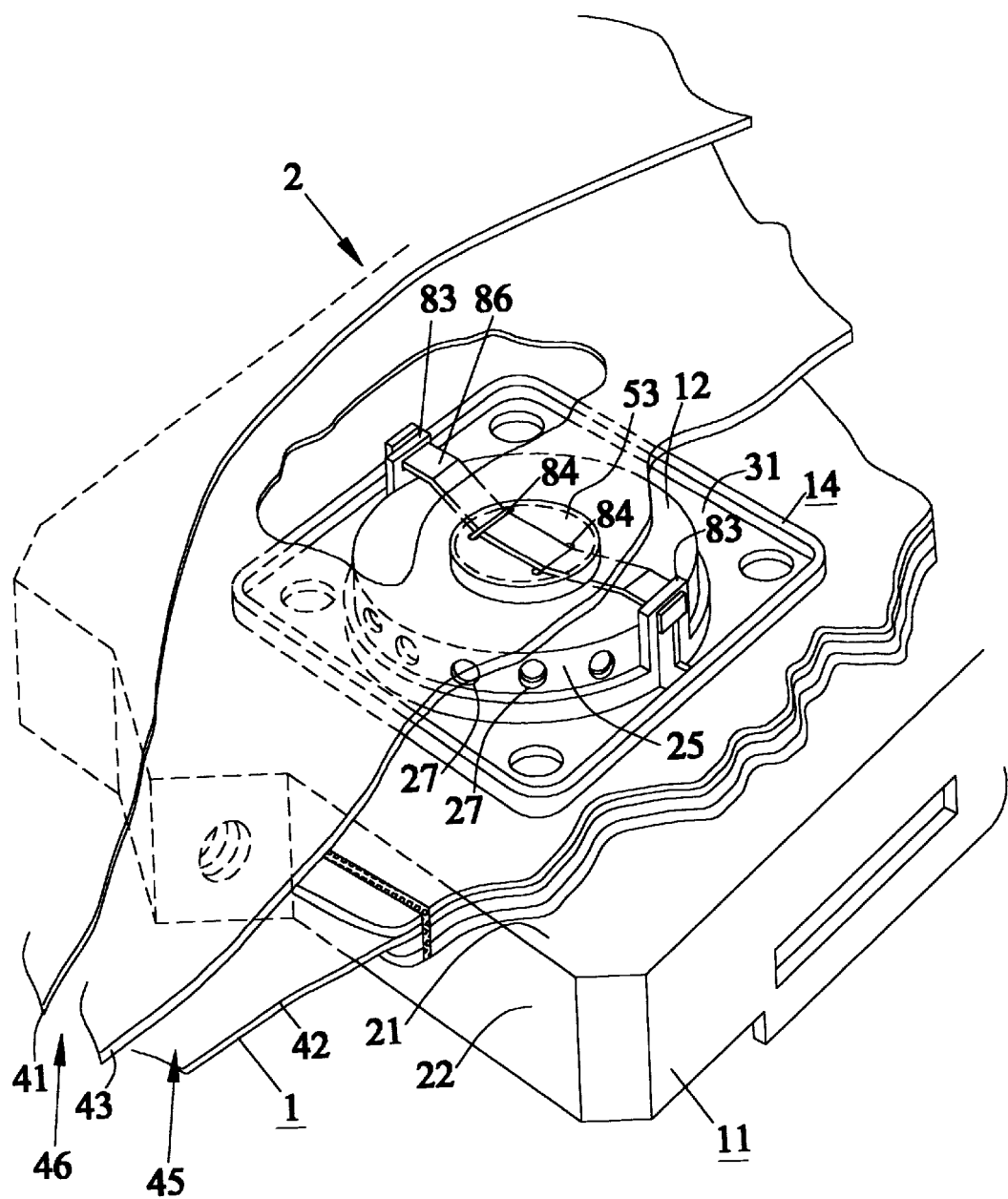
FIG. 17 is an exploded perspective of a part of an air bag apparatus according to an eleventh embodiment of the present invention.

According to the eleventh embodiment shown in FIG. 17, the retainer 14 is provided with a pair of bracket portions 83 protruding upward. A pair of stopper holes 84 are formed in the middle fabric portion 43, with the configuration as above, the center connecting portion 53 at which the middle fabric portion 43 is connected to the supporting member can easily be formed by using an elastic bridging strip 86. To be more specific, by inserting the bridging strip 86 through the two stopper holes 84 and thus holding it to the middle fabric portion 43, and, in this state, respectively engaging the two opposite ends of the bridging strip 86 with the bracket portions 83, the middle fabric portion 43 is connected to the supporting member.

Figure 18:
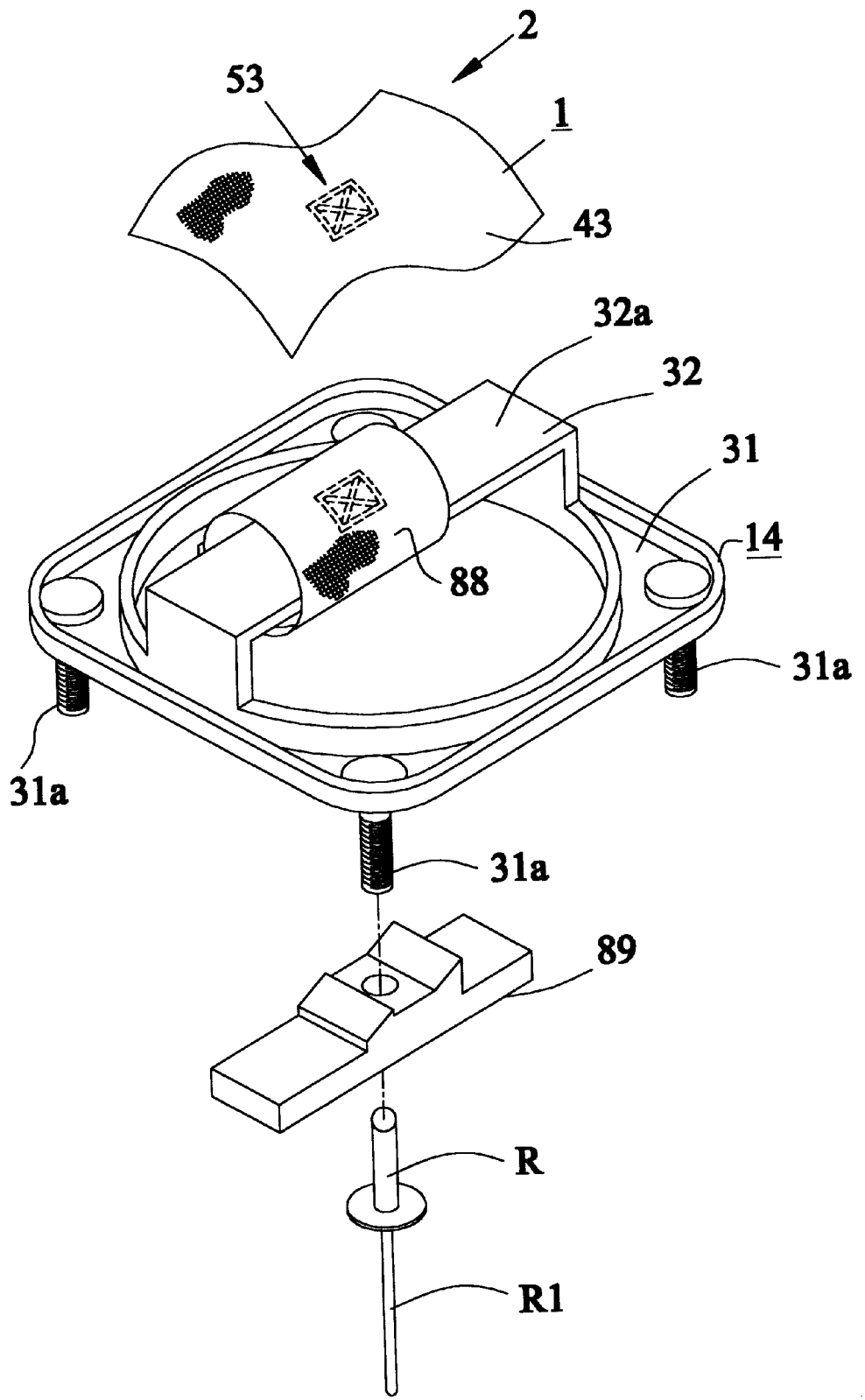
FIG. 18 is an exploded perspective of a part of an air bag apparatus according to a 12th embodiment of the present invention.

According to the 12th embodiment shown in FIG. 18, the retainer 14 has a shape nearly identical to the one shown in FIG. 14 and is provided with a fastening plate portion 32a, at the center of which a fastening hole 31 is formed. A ribbon-like fastening cloth 88 is sewn to the middle fabric portion 43. According to this configuration, the center connecting portion 53 at which the middle fabric portion 43 is connected to the supporting member is formed by wrapping the ribbon-shaped fastening cloth 88 around the fastening plate portion 32a and then fastening the fastening cloth 88 with a rivet R. At that time, if it is necessary, an auxiliary plate may be placed below the fastening plate portion 32a so that the fastening cloth 88 is fastened in the state where it is sandwiched between the auxiliary plate and the fastening plate portion 32a.

The configuration of the center connecting portion 53 is riot limited to one that calls for affixing the middle fabric portion 43 directly to the supporting member that consists of a rigid member; the middle fabric portion 43 and the supporting member may be connected via an auxiliary fabric material or the like.

In an alternative configuration shown in FIG. 19, when the air bag 1 inflates, the distance by which the portion of the middle fabric portion 43 corresponding to the center connecting portion 53, at which the middle fabric portion 43 is connected to the supporting member, projects toward the driver is limited within a range such that the maximum projection plane does not go beyond the end of the steering wheel body 4 facing the driver, i.e. the grip top plane G that is flush with the upper end of the rim portion 6; it is desirable that the maximum projection plane is at least 20 mm behind the grip top plane G. In yet another alternative configuration shown in FIG. 20, when the air bag 1 inflates, the distance by which the portion of the middle fabric portion 43 corresponding to the center connecting portion 53, at which the middle fabric portion 43 is connected to the supporting member, projects toward the driver is limited within a range such that the maximum projection plane does not go beyond the top of the pad, i.e. the point where the driver-side end (the upper end) of the cover C is located when the air bag 1 is in the uninflated state. Both embodiments are capable of easily reducing the pressure applied to the driver from the direction of the center connecting portion 53, even if the driver is extremely close to the steering wheel.

Furthermore, according to any one of the embodiments described above, the center of the middle fabric portion 43 is fastened to the center of the supporting member, such as the inflator 12. However, the middle fabric portion 43 may be fastened to the supporting member, such as the inflator 12 at a location which is offset from the center of either of the middle fabric and the supporting member or from both of them. By changing the inflated shape or the inflating position of the air bag 1 appropriately, this configuration enables the easy control of the shape into which the air bag 1 inflates.

INDUSTRIAL APPLICABILITY

An air bag apparatus according to the present invention can not only be used for a driver-seat air bag system, which is attached to or incorporated in a steering wheel, but also for any other type of air bag systems, including one incorporated in an instrument panel so as to be used for a passenger seat, another which is installed in a side of a seat and used as a side-impact air bag system, and a rear seat air bag system which is installed in the rear part of a front seat. Furthermore, an air bag apparatus according to the present invention is also applicable to a wide variety of air bags and air bag apparatuses for absorbing a shock delivered to an object to be protected.

What is claimed is:

1. An air bag comprising:
   a first fabric portion facing an object to be protected;
   a second fabric portion adapted to form, in combination with said first fabric portion, an outer skin of the air bag, and be fastened to a supporting member;
   one or more middle fabric portions to be disposed between the first fabric portion and the second fabric portion so as to form a plurality of compartments that are arranged in layers such that the planar surfaces face an object to be protected;

a center connecting portion at which the one or more middle fabric portions are connected to said supporting member;

one or more middle connecting portions located between the center connecting portion and an outer edge portion and adapted to connect the one or more middle fabric portion to the second fabric portion;

gas communicating portions located between the one or more middle connecting portions and the outer edge portion and adapted to communicate the compartments; and a gas inlet portion which is adapted to permit a gas to be introduced therethrough and communicates with any one of said compartments other than the compartment that is located closest to the object to be protected.

2. An air bag according to claim 1, wherein at least one of the one or more middle connecting portions is provided with a gas outlet portion adapted to communicate an outside of the air bag with any one of the compartments other than the compartment that is located closest to the supporting member.

3. An air bag according to claim 1, wherein the air bag includes a second gas outlet portion which is located between the one or more middle connecting portions and the outer edge portion and permits any one of said compartments other than the compartment that is located closest to the object to be protected to communicate with the outside of the air bag.

4. An air bag according to claim 2, wherein the air bag includes a second gas outlet portion which is located between the at least one or more of the middle connecting portions and the outer edge portion and permits any one of said compartments other than the compartment that is located closest to the object to be protected to communicate with the outside of the air bag.

5. An air bag according to claim 3, wherein a ventilation resistance of the second gas outlet portion is greater than a ventilation resistance of the gas communicating portions.

6. An air bag according to claim 4, wherein a ventilation resistance of the second gas outlet portion is greater than a ventilation resistance of the gas communicating portions.

7. An air bag according to claim 3, wherein the air bag includes a plurality of second gas outlet portions.

8. An air bag according to claim 4, wherein the air bag includes a plurality of second gas outlet portions.

9. An air bag according to claim 5, wherein the air bag includes a plurality of second gas outlet portions.

10. An air bag according to claim 6, wherein the air bag includes a plurality of second gas outlet portions.

11. An air bag apparatus comprising:
an air bag including:
a first fabric portion facing an object to be protected;
a second fabric portion adapted to form, in combination with said first fabric portion, an outer skin of the air bag, and be fastened to a supporting member;
one or more middle fabric portions to be disposed between the first fabric portion and the second fabric portion so as to form a plurality of compartments that are arranged in layers such that the planar surfaces face an object to be protected;
a center connecting portion at which the one or more middle fabric portions are connected to said supporting member;
one or more middle connecting portions located between the center connecting portion and an outer edge portion and adapted to connect the one or more middle fabric portion to the second fabric portion;

gas communicating portions located between the one or more middle connecting portions and the outer edge portion and adapted to communicate the compartments; and a gas in let portion which is adapted to permit a gas to be introduced therethrough and communicates with any o one of said compartments other than n the compartment that is located closest to th e object to be protected;

a cover adapted to cover said air bag when the air bag is in an uninflated state; and a supporting member to which the air bag and the cover are attached, wherein the one or more middle fabric portions are designed such that when the air bag inflates, the distance by which a portion of each middle fabric portion corresponding to the center connecting portion, at which the one or more middle fabric portions are connected to the supporting member, projects toward the object to be protected is limited within a range such that a maximum projection plane does not go beyond a plane where an object-side end of the cover is located when the air bag is in the uninflated state.

12. The air bag apparatus according to claim 11, wherein at least one of the one or more middle connecting portions is provided with a gas outlet portion adapted to communicate an outside of the air bag with any one of the compartments other than the compartment that is located closest to the supporting member.

13. The air bag apparatus according to claim 11, wherein the air bag includes a second gas outlet portion which is located between the one or more middle connecting portions and the outer edge portion and permits any one of said compartments other than the compartment that is located closest to the object to be protected to communicate with the outside of the air bag.

14. The air bag apparatus according to claim 12, wherein the air bag includes a second gas outlet portion which is located between the at least one or more of the middle connecting portions and the outer edge portion and permits any one of said compartments other than the compartment that is located closest to the object to be protected to communicate with the outside of the air bag.

15. The air bag apparatus according to claim 13, wherein a ventilation resistance of the second gas outlet portion is greater than a ventilation resistance of the gas communicating portions.

16. The air bag apparatus according to claim 14, wherein a ventilation resistance of the second gas outlet portion is greater than a ventilation resistance of the gas communicating portions.

17. The air bag apparatus according to claim 11, wherein the air bag includes a plurality of second gas outlet portions.

18. The air bag apparatus according to claim 12, wherein the air bag includes a plurality of second gas outlet portions.

19. The air bag apparatus according to claim 13, wherein the air bag includes a plurality of second gas outlet portions.

20. The air bag apparatus according to claim 14, wherein the air bag includes a plurality of second gas outlet portions.

21. A steering wheel comprising:
an air bag apparatus having an air bag including:
a first fabric portion facing an object to be protected;
a second fabric portion adapted to form, in combination with said first fabric portion, an outer skin of the air bag, and be fastened to a supporting member;
one or more middle fabric portions to be disposed between the first fabric portion and the second fabric portion so as to form a plurality of compartments that are arranged in layers such that the planar surfaces face an object to be protected;

a center connecting portion at which the one or more middle fabric portions are connected to said supporting member;

one or more middle connecting portions located between the center connecting portion and an outer edge portion and adapted to connect the one or more middle fabric portion to the second fabric portion;

gas communicating portions located between the one or more middle connecting portions and the outer edge portion and adapted to communicate the compartments; and a gas inlet portion which is adapted to permit a gas to be introduced therethrough and communicates with any one of said compartments other than the compartment that is located closest to the object to be protected;

a cover adapted to cover said air bag when the air bag is in an uninflated state, and a supporting member to which the air bag and the cover are attached; and a steering wheel body adapted to permit said air bag apparatus to be mounted thereon;

wherein the one or more middle fabric portions are designed such that when the air bag inflates, a distance by which a portion of each middle fabric portion corresponding to the center connecting portion, at which the one or more middle fabric portions are connected to the supporting member, projects toward an object to be protected is limited within a range such that a maximum projection plane does not go beyond a plane where an object-side end of the steering wheel body is located when the air bag is in the uninflated state.

22. The steering wheel according to claim 21, wherein at least one of the one or more middle connecting portions is provided with a gas outlet portion adapted to communicate an outside of the air bag with any one of the compartments other than the compartment that is located closest to the supporting member.

23. The steering wheel according to claim 21, wherein the air bag includes a second gas outlet portion which is located between the one or more middle connecting portions and the outer edge portion and permits any one of said compartments other than the compartment that is located closest to the object to be protected to communicate with the outside of the air bag.

24. The steering wheel according to claim 22, wherein the air bag includes a second gas outlet portion which is located between the at least one or more of the middle connecting portions and the outer edge portion and permits any one of said compartments other than the compartment that is located closest to the object to be protected to communicate with the outside of the air bag.

25. The steering wheel according to claim 23, wherein a ventilation resistance of the second gas outlet portion is greater than a ventilation resistance of the gas communicating portions.

26. The steering wheel according to claim 24, wherein a ventilation resistance of the second gas outlet portion is greater than a ventilation resistance of the gas communicating portions.

27. The steering wheel according to claim 21, wherein the air bag includes a plurality of second gas outlet portions.

28. The steering wheel according to claim 22, wherein the air bag includes a plurality of second gas outlet portions.

29. The steering wheel according to claim 23, wherein the air bag includes a plurality of second gas outlet portions.

30. The steering wheel according to claim 24, wherein the air bag includes a plurality of second gas outlet portions.

* * * * *

UNITED STATES PATENT AND TRADEMARK OFFICE
CERTIFICATE OF CORRECTION

PATENT NO. : 6,224,101 B1
DATED : May 1, 2001
INVENTOR(S) : Kazuyoshi Nishijima, et al.

It is certified that error appears in the above-identified patent and that said Letters Patent is hereby corrected as shown below:

Title page,
Item 75 Inventors replace "Second, third, fourth, and fifth inventors city of residence" with -- all of Shizuoka, Japan --.

Column 2,
Line 41, replace "member and" with -- member 14 and --.
Line 57, replace "positioned at" with -- positioned on --.

Column 16,
Line 5, replace "gas in let" with -- gas inlet --.
Line 7, replace "any o one" with -- any one --, and replace "than n the" with -- than the --.
Line 8, replace "to th e object" with -- to the object --.

Signed and Sealed this

Eleventh Day of September, 2001

*Attest:*

NICHOLAS P. GODICI
*Attesting Officer*     *Acting Director of the United States Patent and Trademark Office*